UNITED STATES PATENT OFFICE.

ERNEST SOLVAY, OF BRUSSELS, BELGIUM.

IMPROVEMENT IN MANUFACTURE OF HYPOCHLORITES OF LIME AND MAGNESIA FROM THEIR SILICATES AND ALUMINATES.

Specification forming part of Letters Patent No. 196,258, dated October 16, 1877; application filed May 24, 1877.

*To all whom it may concern:*

Be it known that I, ERNEST SOLVAY, of Brussels, in the Kingdom of Belgium, manufacturer, have invented certain Improvements in Means of Utilizing certain Silicates and Aluminates of Lime and of Magnesia, of which the following is a specification:

The object of my invention is to utilize the silica or silicates and aluminates formed in the manufacture of hydrochloric acid or chlorine by the decomposition of an earthy chloride and silica or silicate of alumina in the presence of steam or dry air; and to this end it consists in the utilization of such silicates in the manufacture of the hypochlorites of lime or magnesia and silica or alumina, the latter of which may be used for the manufacture of chlorine or hydrochloric acid, as above mentioned.

In carrying out my invention, I take the compound silicate resulting from the manufacture of chlorine or hydrochloric acid, which will vary in composition according to the earthy chloride and the silicious material employed in such manufacture. Suppose, for instance, that the chloride of calcium and the silicate of alumina are the substances employed in the reaction; the resulting compound will consist of silicate and aluminate of lime. This I expose in a moist condition to the action of chlorine gas, in a suitable vessel, whereupon reaction takes place, resulting in the formation of hypochlorite of lime and pure silica and alumina.

The hypochlorite, being comparatively soluble, may be separated from the silicate, which is insoluble, by lixiviation, the hypochlorite being saved for bleaching, disinfecting, and other purposes, and the silica and alumina for the manufacture of chlorine or hydrochloric acid and compound silicate, as first mentioned, and the reactions may be alternately carried on indefinitely.

In the above instances I have mentioned the chloride of calcium and silicate of alumina as the reagents, for the sake of convenience; but chloride of magnesium may be substituted for the chloride of calcium, and pure silica for the silicate of alumina, with similar results; and I do not therefore limit myself to the chloride of calcium and silicate of alumina.

What I claim, and desire to secure by Letters Patent, is—

The process herein described of producing hypochlorite of lime or magnesia and pure silica, or silica and alumina, by treating the silicate of lime or the silicate and aluminate of lime with chlorine gas, substantially as set forth.

ERNEST SOLVAY.

Witnesses:
R. L. KIRKPATRICK,
U. H. KIRKPATRICK.